Patented Feb. 7, 1933

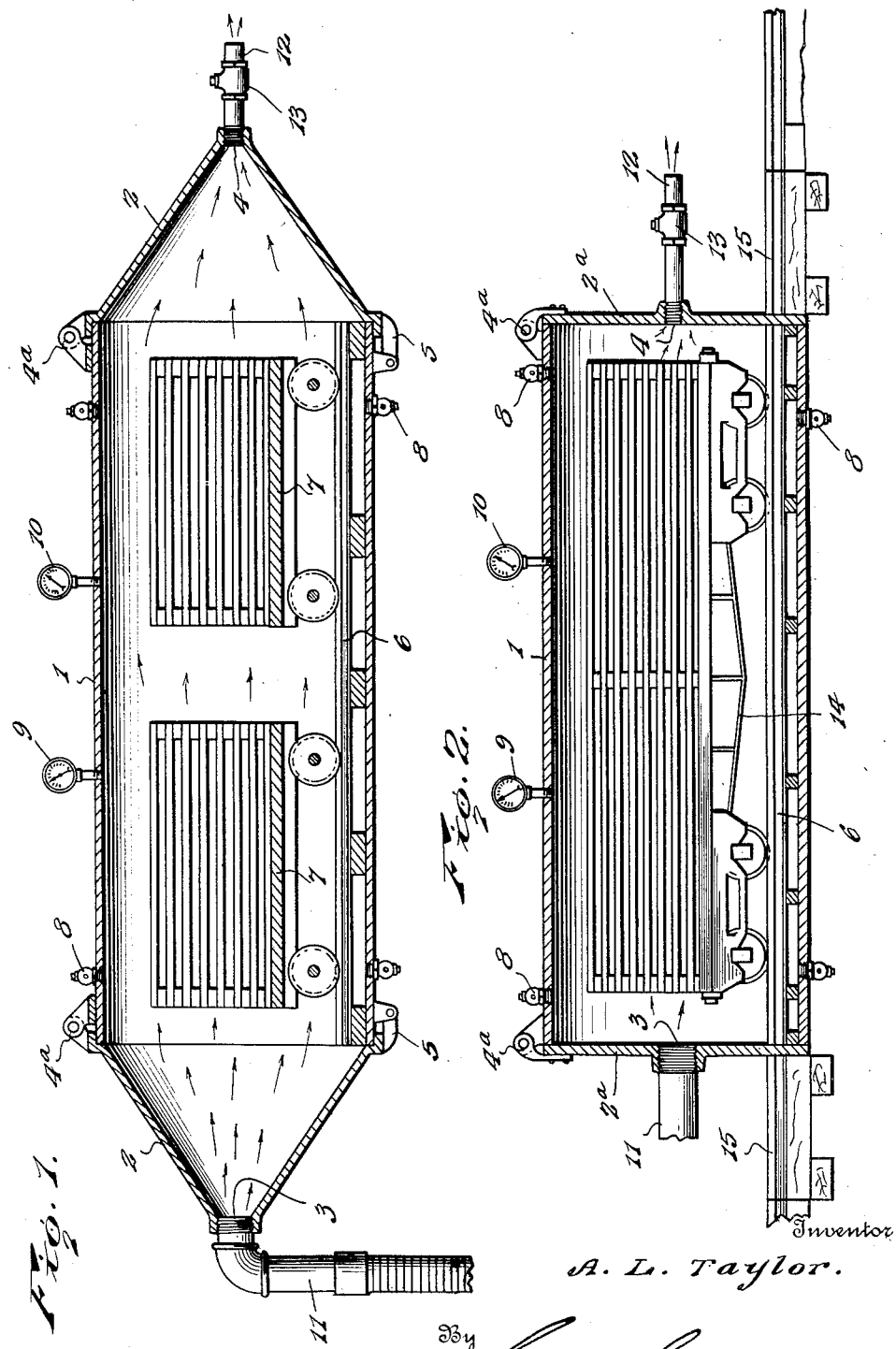

1,896,984

UNITED STATES PATENT OFFICE

ALBERT L. TAYLOR, OF JACKSONVILLE, FLORIDA

METHOD FOR TREATING GREEN LUMBER

Application filed March 29, 1930. Serial No. 440,049.

The transportation and uses of green or partially dried lumber, wood and their fibrous products is costly because of the liquid, commonly called moisture by those skilled in the art, and hereinafter termed moisture content, lodged in the interstices, pores, cells and spaces separating the fibrous structure of the material. This moisture adds materially to the weight of the material, lessens its desirability and lasting qualities and adds to the cost of handling.

Therefore, the primary object of this invention is to eliminate the moisture content from green or partially dried lumber, wood and their fibrous products quickly by use of conditioned air under continuous flow and without causing deterioration or affecting its market value.

In practicing the invention, the green lumber, wood, or their fiber products to be treated is preferably placed in a house or chamber and subjected to conditioned air, and by "conditioned", I mean air, cool and dry, which terms will be hereinafter further qualified as to degree and range, and at a pressure greater than normal atmospheric pressure and under continuous flow, whereby to remove the moisture.

The invention, furthermore, aims to devise apparatus and process simulating in result the natural seasoning and removal of moisture from green or partially dried lumber, wood and their fibrous products, but in a relatively short time—approximately twenty-four hours—so that the lumber is not only reduced in weight but its moisture content is reduced as desired for its different purposes and uses.

While the drawing illustrates a preferred embodiment of the invention, it is to be understood that in adapting the means to meet specific needs and requirements, the design may be varied and changes in the minor details of construction may be resorted to without departing from the spirit thereof.

For a full understanding of the invention and the merits thereof, reference is to be had to the following description and the drawing hereto attached, in which:

Figure 1 is a longitudinal sectional view of an apparatus for carrying out the method.

Figure 2 is a view similar to Figure 1, showing a modified form of apparatus for carrying out the process.

Corresponding and like parts are referred to in the following description and designated in the several views of the drawing by like reference characters.

The numeral 1 designates the body of a chamber, building, or other enclosed vessel or drum adapted to receive the material to be treated. In the form illustrated in Figure 1 of the drawing, the chamber or vessel is provided with conical or tapering ends 2 which have their apices formed with openings to provide an inlet 3 and an outlet 4. The tapering or conical ends 2 are preferred since they obviate the formation of dead air spaces. The end closures 2 are movable and are preferably hinged, as indicated at 4a, and made secure when closed by suitable fastening means 5. This provides ready means for introducing the material to be processed into the chamber and removing the same. A track 6 is located in the bottom portion of the chamber to admit of running cars 7 thereon when placing the material in the chamber and removing the same therefrom after treatment. This precludes handling of the same and materially reduces the cost of treatment since the loaded car is run into the chamber when placing the material in position for treatment, and the car is run therefrom after the material has been treated and the moisture removed therefrom. Bleeder valves 8 are applied to the sides of the body 1. Gauges 9 and 10 are likewise connected to the body 1 for indicating pressure and the humidity of the air and such other devices, gauges and controls may be added as desired in carrying out the process. The numeral 11 designates an induction pipe which leads from a source of conditioned air under pressure such as a compressor or other means of creating high pressure air. The meaning of the term "conditioned" just used will be hereinafter explained in detail, it being sufficient to here state that, broadly, the term, as I use it, means the removal of moisture from the atmospheric air to be subsequently used in the chamber together with the lowering of temperature of the compressed air prior to its entry into the chamber. The numeral 12 indicates an eduction pipe for the outflow of the moisture-laden air in its discharge from the chamber. The eduction pipe 12 preferably has a pressure controlled valve 13 associated therewith, the purpose being to maintain a predetermined air pressure (for example, cypress in general requires 25 to 500 pounds more or less) within the chamber or vessel during the carrying out of the process The inlet 3 and outlet 4 are shown unequal in area and while this is preferred, it is not essential so long as provision is had for ingress of conditioned air under pressure and egress of the moisture-laden air, while, at the same time, preserving a pressure within the chamber in excess of normal atmospheric pressure.

In the form of apparatus illustrated in Figure 2, the end closures 2a are flat or may be made of other desired contour to meet various conditions and provided with central openings constituting the inlet 3 and the outlet 4 with which the respective induction and eduction pipes 11 and 12 connect. These end closures are hinged at 4a to swing out of the way when running a loaded car 14 into or out of the chamber. Sections of the track adjacent the ends of the chamber are made removable, as indicated at 15, to facilitate the opening and closing of the ends 2a.

Since economy in the handling and treating of green lumber or partially dried lumber, wood and their fibrous products is a prime factor, the apparatus is disposed to admit of cars loaded with the lumber to be run into the chamber for treatment and out therefrom after treatment, thereby avoiding individual handling of the material. The chamber, building or analogous receiver, is closed to maintain an internal pressure while the material is being treated.

As above mentioned, it is essential to the practice of the invention that the air be conditioned before entry into the container. Conditioning the air consists of first highly compressing the air, for example, to 125 pounds pressure, then subjecting said compressed air immediately to a cooling step and moisture removing step, both of these steps taking place simultaneously, and, during these steps, the highly compressed air, which usually is to be found emerging from the compressor, for instance, at a temperature of 220 degrees Fahrenheit, at 125 pounds pressure, is reduced to about 72 degrees Fahrenheit while the moisture content is reduced to approximately from 3 per cent to 30 per cent of full saturation. For this conditioning, it will be found sufficient to use any of the well-known types of compressors and conditioners, such as to be found on the market, to accomplish the above described conditioning step, that is, compressing the air to high pressure, as described, then immediately cooling and simultaneously removing the moisture therefrom by an accessory connected with the compressor and forming part of compressor equipment for various purposes and uses in the trade. Thus, it will be seen that before permitting the air to enter the container for removing the moisture content of the material being treated, the air is first, and this is essential, conditioned or compressed to a high degree of compression, such as above described, for example, then relieved of its moisture content down to about 3 to 12 per cent more or less of saturation, and simultaneously reduced in temperature to approximately 65 to 75 degrees Fahrenheit. And, as used throughout the specification, the terms "cool" and "dry" are meant to be interpreted in the light of the above explanation of conditioning or reducing the temperature of the highly compressed air to about 65 to 75 degrees Fahrenheit and removing the moisture content of the air to 3 to 12 per cent more or less, as also above described. And, furthermore, it will be here stated that wherever the term pressure greater than normal atmospheric pressure is used throughout the specification it is intended to limit the meaning of this terminology to mean a pressure of from 25 to 5000 pounds.

In accordance with the present invention and in carrying out the method, the green lumber, wood, or their fiber products, is placed in the chamber or building and subjected to cool dry, conditioned, air at a pressure in excess of normal atmospheric pressure. This step removes the moisture quickly and thoroughly without tendency to harden the surface of the lumber which would interfere with ready removal of the moisture from the innermost spaces and passages formed by the fibers, cells and like structure. It is essential that the interior pressure be maintained and it is also essential that the moisture-laden air escape and for this purpose the air under pressure enters the chamber at a greater rate than the discharge of the moisture-laden air. For this reason, the inlet 3 is usually larger than the outlet 4. The valve 13 in the eduction pipe 12 is of a construction to open only under a predetermined pressure and closes when, from any cause, the pressure within the chamber becomes less than the predetermined pressure found most advantageous in producing the best results.

The process removes the moisture quickly and without affecting the market value of the material, thereby materially cheapening the cost of transportation and handling besides enabling the material to be used immediately after delivery.

Lumber products treated in accordance with the present invention, while thoroughly depleted to desired moisture content, does not tend to check, split, shrink or warp, and possesses substantially the same characteristics as lumber seasoned by the usual natural process but which is objectionable because of the length of time required in the curing or treating.

It is observed that the process is continuous, i. e., the conditioned cool dry air under pressure flows into and through the chamber and out therefrom without interruption, except for a momentary interval due to the action of the valve 13 in the eduction pipe 12. The flow, however, is such as to maintain a predetermined pressure within the chamber at all times in excess of normal atmospheric pressure.

What is claimed is:

1. A lumber and wood conditioning process comprising subjecting the material to the action of air having low relative humidity, low temperature, and high pressure, whereby to expel moisture from the interstices of the material and simultaneously introduce said air thereinto.

2. A lumber and wood conditioning process comprising subjecting the material to contact with a continuous flow of air having low relative humidity, low temperature, and high pressure, whereby to expel moisture from the interstices of the material and simultaneously introduce said air thereinto.

In testimony whereof I affix my signature.

ALBERT L. TAYLOR. [L. S.]